(12) United States Patent
Ahn et al.

(10) Patent No.: US 7,969,860 B2
(45) Date of Patent: *Jun. 28, 2011

(54) TRANSMITTER APPARATUS, RECEIVER APPARATUS, TRANSMITTING METHOD, RECEIVING METHOD, AND PROGRAM

(75) Inventors: Chang-Jun Ahn, Tokyo (JP); Masayuki Fujise, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 141 days.

This patent is subject to a terminal disclaimer.

(21) Appl. No.: 12/423,360

(22) Filed: Apr. 14, 2009

(65) Prior Publication Data

US 2009/0231991 A1  Sep. 17, 2009

Related U.S. Application Data

(63) Continuation of application No. 10/569,657, filed on Feb. 24, 2006, now Pat. No. 7,630,291.

(51) Int. Cl.
*H04J 11/00* (2006.01)
(52) U.S. Cl. ......................... 370/208; 370/210
(58) Field of Classification Search .................. 370/208, 370/210; 375/260, 264
See application file for complete search history.

(56) References Cited

U.S. PATENT DOCUMENTS 7,630,291 B2 * 12/2009 Ahn et al. ..................... 370/208

FOREIGN PATENT DOCUMENTS

| EP | 1239596 A2 | 9/2002 |
|---|---|---|
| JP | 2001036445 | 2/2001 |
| JP | 2001320344 | 11/2001 |
| JP | 2002261727 | 9/2002 |
| WO | 2005025101 A1 | 3/2005 |

OTHER PUBLICATIONS

European Search Report for European patent application No. 03818547.3-2411/1662684 PCT/JP0311110, dated Apr. 5, 2009.

(Continued)

*Primary Examiner* — Albert T Chou
(74) *Attorney, Agent, or Firm* — Howard & Howard Attorneys PLLC

(57) ABSTRACT

A serial-parallel converter 102 of a transmitter apparatus receives an input of a signal to be transmitted and serial-parallel-converts this to output m (m≧2) number of intermediate signals. A unitary matrix modulator 103 modulates the output m number of intermediate signals into a unitary matrix of m rows and m columns whose components other than diagonal components are 0 and outputs the obtained matrix. A splitter 111 supplies the respective diagonal components of the output matrix to the input channels of an inverse Fourier transform unit 112 as input signals. The inverse Fourier transform unit 112 outputs m number of inverse-Fourier-transformed signals obtained by performing inverse Fourier transform of the supplied input signals. A parallel-serial converter 113 parallel-serial-converts the output m number of inverse-Fourier-transformed signals to output one transmission signal. A transmission unit 114 transmits the output transmission signal. The difference between the frequency of any two channels of the inverse Fourier transform unit 112 is equal to or larger than a predetermined coherent bandwidth.

16 Claims, 7 Drawing Sheets

OTHER PUBLICATIONS

Xiang-Gian, X. (Aug. 2001). "Precoded and Vector OFDM Robust to Channel Spectral Nulls and With Reduced Cyclic Prefix Length in Single Transmit Antenna Systems" IEEE Transactions on Communications, vol. 49., No. 8, pp. 1363-1374.

Yoshimochi, N. et al. (Jun. 2003). "LDPC coded unitary space-time modulated OFDM system in broadband mobile channel." Electronic Letters, vol. 39, No. 13.

Japanese International Search Report mailed Dec. 9, 2003 for International application No. PCT/JP03/11110.

Yoshimochi, N. et al. (Jan. 2003). LDPC Coded Unitary Space-Time Modulated OFDM in Broadband Mobile Channel.: The Institute of Electronics, Information and Communication Engineers, vol. 102, No. 551, pp. 91-96.

Ahn, C. & Sasase, I. (Oct. 2002). "Convolutional Coded Coherent and Differential Unitary Space-Time Modulated OFDM with Bit Interleaving for Multiple Antenna system." The Institute of Electronics, Information and Communication Engineers, vol. 102, No. 392, pp. 75-80.

Hochwald, B. & Marzetta, T. (Mar. 2000). "Unitary Space-Time Modulation for Multiple-Antenna Communications in Rayleigh Flat Fading." IEEE Transactions on Information Theory, vol. 46, No. 2, pp. 543-564.

\* cited by examiner $r_{i,j} \rightarrow c_{j \times m + i}$ $r_{i,j} \rightarrow c_{j \times (m+1) + i}$ ＃ TRANSMITTER APPARATUS, RECEIVER APPARATUS, TRANSMITTING METHOD, RECEIVING METHOD, AND PROGRAM

RELATED APPLICATIONS

This is a continuation patent application of non-provisional patent application Ser. No. 10/569,657 filed on Feb. 24, 2006, now U.S. Pat. No. 7,630,291, and incorporated herewith in its entirely.

TECHNICAL FIELD

The present invention relates to a transmitter apparatus, a receiver apparatus, a transmitting method, and a receiving method for performing efficient communication by using modulation/demodulation by a unitary matrix in which components other than the diagonal components are 0, and a program for realizing these on a computer.

BACKGROUND ART

Earlier techniques relating to OFDM (Orthogonal Frequency Division Multiplex) modulation/demodulation and earlier techniques relating to modulation/demodulation using a unitary matrix are disclosed in the literatures indicated below.
[Patent Literature 1] Unexamined Japanese Patent Application KOKAI Publication No. 2002-261727
[Patent Literature 2] Unexamined Japanese Patent Application KOKAI Publication No. 2001-320344
[Patent Literature 3] Unexamined Japanese Patent Application KOKAI Publication No. 2001-36445
[Non-Patent Literature 1] Chang-Jun AHN and Iwao SASASE, Convolutional Coded Coheretn and Differential Unitary Space-Time Modulated OFDM with Bit Interleaving for Multiple Antenna System, technical report of IEICE, TECHNICAL REPORT OF IEICE, SST2002-47, October 2002, pp. 75-80

Patent Literature 1 discloses an invention relating to a multi-carrier signal transmitter apparatus used in digital wireless communications.

Particularly, the literature discloses an OFDM signal transmitter apparatus which is designed to supply a same single local oscillation signal output from a single local oscillator to a plurality of transmitter side frequency converters corresponding to a plurality of antennas respectively, and which can realize high-speed transmission by improving frequency utilization efficiency while maintaining the orthogonality of the carriers in the plurality of antennas.

Patent Literature 2 discloses an invention relating to channel estimation by clustered OFDM receiver apparatuses.

Particularly, the literature discloses an invention which supplies signals having come to one or more antennas through respective transmission channels to corresponding FFT elements, filters the outputs from the FFT elements, combines the filtered signals, and supplies the combined signal to a threshold element, and which uses a unique matrix of a frequency-domain correlation matrix of each channel as the optimum channel estimator, wherein the matrix is dependent on the delay profile of each channel.

Patent Literature 3 discloses an invention relating to a diversity receiving device for mobile transmitter apparatus, which performs bandwidth-division diversity reception by using a plurality of received signals having the same frequency, and employs simultaneous FFT, thereby to reduce the size of the apparatus and improve its mobility.

Particularly, the literature discloses a diversity receiving device which requires no more than one cable, and has an FFT means for obtaining frequency axis data by fast Fourier transform, and a selecting/combining output means for calculating differences between symbols of the frequency axis data and selecting or combining differentially demodulated carrier data of OFDM signals obtained by the difference calculation to output the selected or combined data.

Non-Patent Literature 1 is a paper of a past study joined by one of the inventors listed in the present application, and discloses an invention which performs space-time modulation/demodulation by a unitary matrix, and transmits signals at different times with the use of a plurality of antennas.

Notwithstanding these techniques, various other communication techniques applicable to OFDM communications are strongly demanded.

The present invention was made to solve the above-described problem, and an object of the present invention is to provide a transmitter apparatus, a receiver apparatus, a transmitting method, and a receiving method for performing efficient communication by using modulation/demodulation by a unitary matrix in which components other than the diagonal components are 0, and a program for realizing these on a computer.

DISCLOSURE OF INVENTION

To achieve the above object, the following invention is disclosed in accordance with the principle of the present invention.

A transmitter apparatus according to a first aspect of the present invention comprises a serial-parallel converter, a unitary matrix modulator, a splitter, an inverse Fourier transform unit, a parallel-serial converter, and a transmission unit, and is structured as follows.

The serial-parallel converter receives an input of a signal to be transmitted, and serial-parallel-converts the signal to output m (m≧2) number of intermediate signals.

The unitary matrix modulator modulates the output m number of intermediate signals into a unitary matrix having m rows and m columns whose components other than whose diagonal components are 0, and outputs the obtained matrix.

The splitter supplies the respective diagonal components of the output matrix to input channels of the inverse Fourier transform unit as input signals.

The inverse Fourier transform unit outputs m number of inverse-Fourier-transformed signals obtained by performing inverse Fourier transform of the input signals supplied to the input channels.

The parallel-serial converter parallel-serial-converts the output m number of inverse-Fourier-transformed signals to output one transmission signal.

The transmission unit transmits the output transmission signal.

The difference between the frequencies of any two of the channels of the inverse Fourier transform unit is equal to or larger than a predetermined coherent bandwidth.

A receiver apparatus according to another aspect of the present invention comprises a reception unit, a serial-parallel converter, a Fourier transform unit, an inverse splitter, a unitary matrix demodulator, and a parallel-serial converter, and is structured as follows.

The reception unit receives a transmission signal having been transmitted, and outputs this as a reception signal.

The serial-parallel converter serial-parallel-converts the output reception signal to output m (m≧2) number of intermediate signals.

The Fourier transform unit outputs m number of Fourier-transformed signals obtained by performing Fourier transform of the output m number of intermediate signals.

The inverse splitter supplies the output m number of Fourier-transformed signals to the unitary matrix demodulator.

The unitary matrix demodulator demodulates a unitary matrix having m rows and m columns whose components other than whose diagonal components are 0, from a matrix having m rows and m columns in which each of the supplied m number of Fourier-transformed signals are its diagonal component and components other than the diagonal components are 0.

The parallel-serial converter parallel-serial-converts the demodulated plurality of demodulated signals, and outputs them as a signal having been transmitted.

The difference between the frequencies of any two of channels of the Fourier transform unit is equal to or larger than a predetermined coherent bandwidth.

A transmitting method according to another aspect of the present invention comprises a serial-parallel converting step, a unitary matrix modulating step, a splitting step, an inverse Fourier transforming step, a parallel-serial converting step, and a transmitting step, and is configured as follows.

At the serial-parallel converting step, an input of a signal to be transmitted is received and the signal is serial-parallel-converted to output m (m≧2) number of intermediate signals.

At the unitary matrix modulating step, the output m number of intermediate signals are modulated into a unitary matrix having m rows and m columns whose components other than whose diagonal components are 0, and the obtained matrix is output.

At the splitting step, the respective diagonal components of the output matrix are supplied to input channels of inverse Fourier transform as input signals.

At the inverse Fourier transforming step, m number of inverse-Fourier-transformed signals are output, which are obtained by performing inverse Fourier transform of the input signals supplied to the input channels of inverse Fourier transform.

At the parallel-serial converting step, the output m number of inverse-Fourier-transformed signals are parallel-serial-converted to output one transmission signal.

At the transmitting step, the output transmission signal is transmitted.

The difference between the frequencies of any two of the channels of inverse Fourier transform at the inverse Fourier transforming step is equal to or larger than a predetermined coherent bandwidth.

A receiving method according to another aspect of the present invention comprises a receiving step, a serial-parallel converting step, a Fourier transforming step, an inverse splitting step, a unitary matrix demodulating step, and a parallel-serial converting step, and is configured as follows.

At the receiving step, a transmission signal having been transmitted is received and output as a reception signal.

At the serial-parallel converting step, the output reception signal is serial-parallel-converted to output m (m≧2) number of intermediate signals.

At the Fourier transforming step, m number of Fourier-transformed signals are output, which are obtained by performing Fourier transform of the output m number of intermediate signals.

At the inverse splitting step, the output m number of Fourier-transformed signals are supplied to the unitary matrix demodulating step.

At the unitary matrix demodulating step, a unitary matrix having m rows and m columns whose components other than whose diagonal components are 0 is demodulated from a matrix having m rows and m columns in which each of the supplied m number of Fourier-transformed signals is its diagonal component and components other than the diagonal components are 0.

At the parallel-serial converting step, the demodulated plurality of demodulated signals are parallel-serial-converted, to output them as a signal having been transmitted.

The difference between the frequencies of any two of channels of Fourier transform at the Fourier transforming step is equal to or larger than a predetermined coherent bandwidth.

A transmitter apparatus according to another aspect of the present invention comprises a serial-parallel converter, a plurality of unitary matrix modulators, a splitter, an inverse Fourier transform unit, a parallel-serial converter, and a transmission unit, and is structured as follows.

The serial-parallel converter receives an input of a signal to be transmitted, and serial-parallel-converts the signal to output m×n (m≧2, n≧1) number of intermediate signals.

The plurality of unitary matrix modulators each modulate any m number of signals of the output m×n number of intermediate signals, with no doubles, into a unitary matrix having m rows and m columns whose components other than whose diagonal components are 0, and output the obtained matrix.

The splitter supplies the respective diagonal components of the output matrix to input channels of the inverse Fourier transform unit as input channels.

The inverse Fourier transform unit outputs m number of inverse-Fourier-transformed signals obtained by performing inverse Fourier transform of the input signals supplied to the input channels thereof.

The parallel-serial converter parallel-serial-converts the output m number of inverse-Fourier-transformed signals to output one transmission signal.

The transmission unit transmits the output transmission signal.

Among any two channels of the inverse Fourier transform unit, any two channels to which the diagonal components of the matrix output from the plurality of unitary matrix modulators are supplied have therebetween a frequency difference which is equal to or larger than a predetermined coherent bandwidth.

The transmitter apparatus of the present invention may be structured such that a diagonal component on a j-th row and a j-th column of a matrix output from an i-th one of the plurality of unitary matrix modulators (where 0≦i<n, 0≦j<m) is supplied to a j×m+i-th input channel of the inverse Fourier transform unit.

A receiver apparatus according to another aspect of the present invention comprises a reception unit, a serial-parallel converter, a Fourier transform unit, an inverse splitter, a plurality of unitary matrix demodulators, and a parallel-serial converter, and is structured as follows.

The reception unit receives a transmission signal having been transmitted, and outputs this as a reception signal.

The serial-parallel converter serial-parallel-converts the output reception signal to output m×n (m≧2, n≧1) number of intermediate signals.

The Fourier transform unit outputs m×n number of Fourier-transformed signals obtained by performing Fourier-transform of the output m×n number of intermediate signals.

The inverse splitter supplies n number of signals of the output m×n number of Fourier-transformed signals to each of the unitary matrix demodulators with no doubles.

Each of the plurality of unitary matrix demodulators demodulates a unitary matrix having m rows and m columns whose components other than whose diagonal components are 0, from a matrix having m rows and m columns in which each of the supplied m number of Fourier-transformed signals is its diagonal component and components other than the diagonal components are 0.

The parallel-serial converter parallel-serial-converts the plurality of demodulated signals having been demodulated, and outputs them as signals having been transmitted.

Among any two channels of the Fourier transform unit, any two channels that are to output Fourier-transformed signals to be supplied to each of the plurality of unitary matrix demodulators have therebetween a frequency difference which is equal to or larger than a predetermined coherent bandwidth.

The receiver apparatus according to the present invention may be structured such that each of the plurality of unitary matrix demodulators compares each of a plurality of predetermined unitary matrices which each have m rows and m columns and whose components other than whose diagonal components are 0, with a matrix having m rows and m columns in which each of the supplied m number of Fourier-transformed signals is its diagonal component and components other than the diagonal components are 0, selects one of the plurality of predetermined unitary matrices that has a smallest Euclidean distance, and obtains the selected one as a demodulation result.

The receiver apparatus according to the present invention may be structured such that a diagonal component on a j-th row and a j-th column of the matrix compared by an i-th one of the plurality of unitary matrix demodulators (where $0 \leq i < n$, $0 \leq j < m$) is one that has been output from a j×m+i-th output channel of the inverse Fourier transform unit.

A program according to another aspect of the present invention is configured to control a computer to function as each unit of the above-described transmitter apparatus.

A program according to another aspect of the present invention is configured to control a computer to function as each unit of the above-described receiver apparatus.

The transmitter apparatus, the receiver apparatus, the transmitting method, and the receiving method of the present invention can be realized by the programs of the present invention being executed by a computer capable of communicating with other devices.

Further, an information recording medium storing the programs of the present invention may be distributed or sold independently from the computer. Furthermore, the programs of the present invention may be transmitted, distributed, and sold via a computer communication network such as the Internet, etc.

Particularly, in a case where the computer includes a programmable electronic circuit such as a DSP (Digital Signal Processor), an FPGA (Field Programmable Gate Array), etc., a software radio type method which would realize the transmitter apparatus and receiver apparatus of the present invention becomes available, if the programs of the present invention stored on an information recording medium are transmitted to the computer so that the DSP or FPGA in the computer may execute the programs.

BEST MODE FOR CARRYING OUT THE INVENTION

The best embodiment for carrying out the present invention will be described below. However, the present embodiment is intended for illustration, and other embodiments that are under the principle of the present invention will thus also be included in the scope of the present invention.

First, a unitary matrix to be used in the present embodiment will be described. As for a square matrix S having m rows and m columns (its component on the i-th row and j-th column being expressed as $s_{i,j}$) and its adjoint matrix (conjugate transpose matrix) S* (its component on the i-th row and j-th column being $s_{i,j}{}^*$, where x* being a conjugate complex number of x), in a case where $$SS^* = S^*S = E$$

is established, where E is an identity matrix having m rows and m columns, S is said to be a "unitary matrix". According to the present embodiment, a unitary matrix whose components other than the diagonal components are all 0 will be used.

For example, as a unitary matrix having 2 rows and 2 columns, the one shown below is conceivable.

$$\begin{pmatrix} 1 & 0 \\ 0 & 1 \end{pmatrix}$$ [Mathematical Expression 1]

$$\begin{pmatrix} i & 0 \\ 0 & i \end{pmatrix}$$ [Mathematical Expression 2]

$$\begin{pmatrix} -1 & 0 \\ 0 & -1 \end{pmatrix}$$ [Mathematical Expression 3]

$$\begin{pmatrix} -i & 0 \\ 0 & -i \end{pmatrix}$$ [Mathematical Expression 4]

In order to decide what matrix to select as a unitary matrix having m rows and m columns whose components other than the diagonal components are 0, a technique similar to that disclosed in [Non-Patent Literature 1] can be employed.

In the explanation example below, those four kinds of unitary matrices above will be employed for modulation/demodulation. Since it being $4=2^2$, 2-bit information can be associated with these unitary matrices in one-to-one correspondence.

Hence, 2-bit inputs as shown below are associated with these, respectively.

$$\begin{pmatrix} 0 \\ 0 \end{pmatrix}$$ [Mathematical Expression 5]

$$\begin{pmatrix} 1 \\ 0 \end{pmatrix}$$ [Mathematical Expression 6]

-continued $$\begin{pmatrix} 0 \\ 1 \end{pmatrix}$$ [Mathematical Expression 7]

$$\begin{pmatrix} 1 \\ 1 \end{pmatrix}$$ [Mathematical Expression 8]

Modulation/demodulation by a unitary matrix of two rows and two columns will be explained based on these examples. That is, in a case where two signals represented by [Mathematical Expression 5] to [Mathematical Expression 8] (the values of the respective components each corresponding to one signal) are input, to be output by unitary matrix modulation as a modulation result is a matrix represented by [Mathematical Expression 1] to [Mathematical Expression 4] that is associated with the two signals. The reverse of this operation is done by unitary matrix demodulation.

(Basic Unitary Matrix Modulation)

Figure 1:
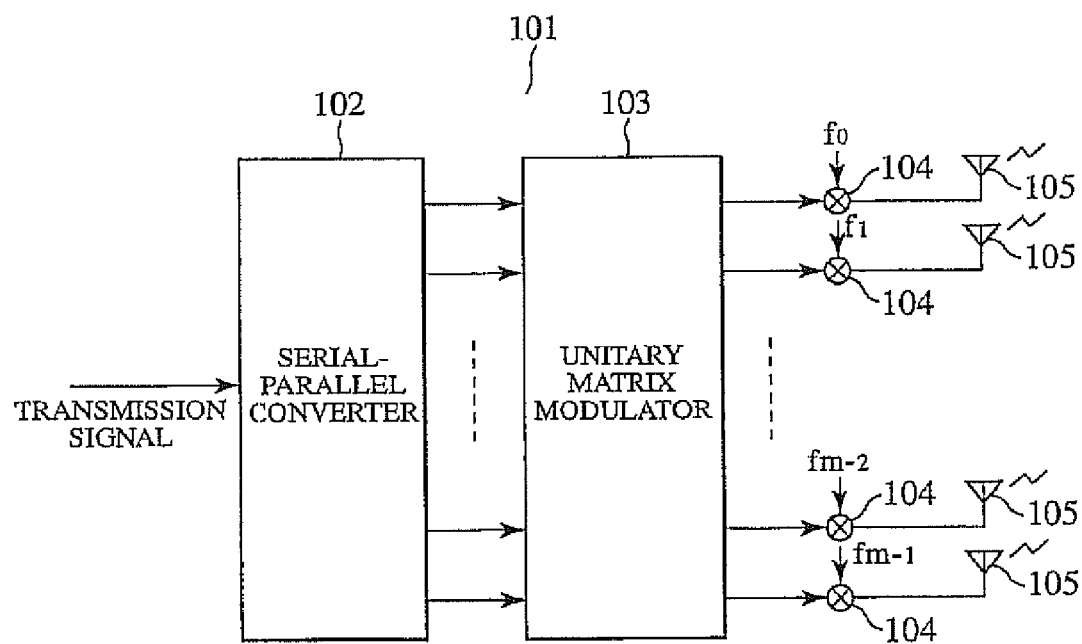
FIG. 1 is an exemplary diagram of a transmitter apparatus which performs the simplest unitary matrix modulation.

FIG. 1 is a block diagram of a transmitter apparatus which performs the simplest unitary matrix modulation. The following explanation will be given with reference to this drawing.

In the transmitter apparatus 1, a signal to be transmitted is input to a serial-parallel converter 102 at a rate of f bits per unit time.

The serial-parallel converter 102 serial-parallel-converts the signal into two intermediate signals. Hence, the output rate of each intermediate signal is f/2 per unit time.

Next, these intermediate signals are supplied to a unitary matrix modulator 103. The unitary matrix modulator 103 receives the input of the two intermediate signals and outputs two modulated signals. In this case, with the input two intermediate signals seen as a vertical vector ([Mathematical Expression 5] to [Mathematical Expression 8]), the unitary matrix modulator 103 outputs a matrix ([Mathematical Expression 1] to [Mathematical Expression 4]) that is associated with the vertical vector.

For example, in a case where the two intermediate signals are those that are represented by [Mathematical Expression 5] and the matrix that should be output is one that is represented by [Mathematical Expression 1], "1, 0" is output as one of the modulated signals and "0, 1" is output as the other in the time order. Thus, the output rate of each modulated signal is f per unit time.

Then, respective superimposing units 104 superimpose the modulated signals on carrier waves having different carrier frequencies from each other. The values of the respective components of the unitary matrix are generally complex numbers, thus changing the phase of the results of superimposition. Respective antennas 5 output the corresponding signals.

As described above, the components of the unitary matrix output by the unitary matrix modulator 105 other than its diagonal components are 0. Accordingly, in the above-described example, when any of the antennas 105 outputs a signal (when the transmission power is not 0), none of the other antennas 105 outputs a signal (the transmission power is 0). In this manner, one signal is transmitted while being extended on a time axis and a space axis respectively.

Here, taking advantage of that the antennas 105 output signals mutually exclusively, i.e., the diagonal components of the unitary matrix output by the unitary matrix modulator 103 are all 0, compression on the time axis will be considered. Further to consider is to manage with only one antenna 105, as the embodiment shown in FIG. 1 indicates that the required number of antennas 105 is equal to the number of dimensions of the unitary matrix. The technique to be used therefor is the OFDM technique.

Embodiment of Transmitter Apparatus

Figure 2:
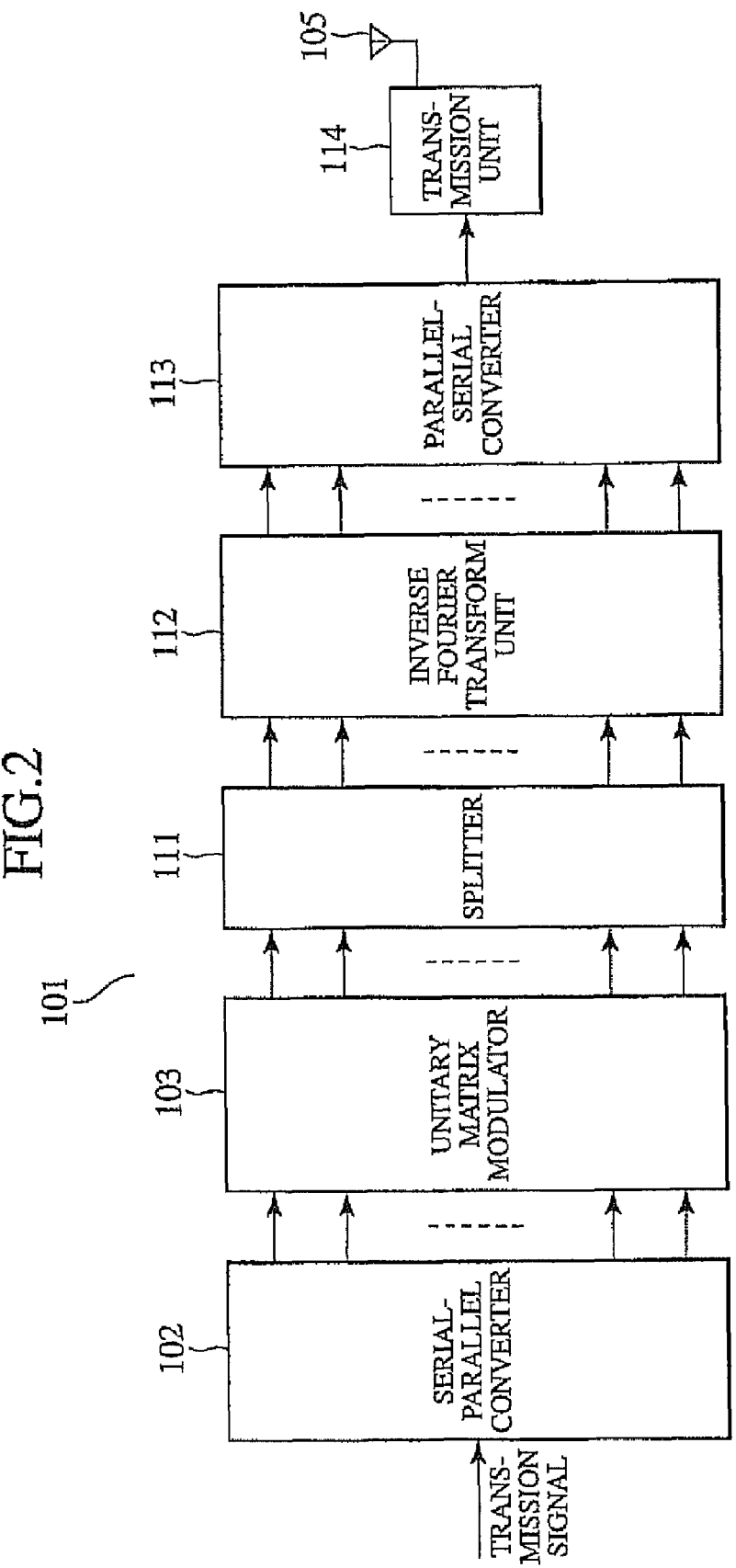
FIG. 2 is an exemplary diagram showing a rough structure of a transmitter apparatus in which an OFDM technique and unitary matrix modulation are combined.

FIG. 2 shows a rough structure of a transmitter apparatus in which the OFDM technique and unitary matrix modulation are combined. In the transmitter apparatus 101, the processes of the serial-parallel converter 102 and unitary matrix modulator 103 are the same as the embodiment shown in FIG. 1.

That is, when a signal to be transmitted is input to the serial-parallel converter 102, the serial-parallel converter 102 serial-parallel-converts the signal into two intermediate signals.

Next, these intermediate signals are supplied to the unitary matrix modulator 103. The unitary matrix modulator 103 receives the input of the two intermediate signals and outputs two modulated signals. In this case, with the input two intermediate signals seen as a vertical vector ([Mathematical Expression 5] to [Mathematical Expression 8]), the unitary matrix modulator 103 outputs a matrix ([Mathematical Expression 1] to [Mathematical Expression 4]) that is associated with the vertical vector.

For example, in a case where the two intermediate signals are those that are represented by [Mathematical Expression 6] and the matrix that should be output is one that is represented by [Mathematical Expression 2], "i, 0" is output as one of the modulated signals and "0, i" is output as the other in the time order.

Then, a splitter 111 inputs combinations of the real part and imaginary part of those signals output from the unitary matrix modulator 103 (the combinations corresponding to the number of dimensions of the matrix) to combinations (I channel and Q channel) of the real part and imaginary part of an inverse Fourier transform unit 112 respectively, so that inverse Fourier transform will be applied thereon.

Figure 3:
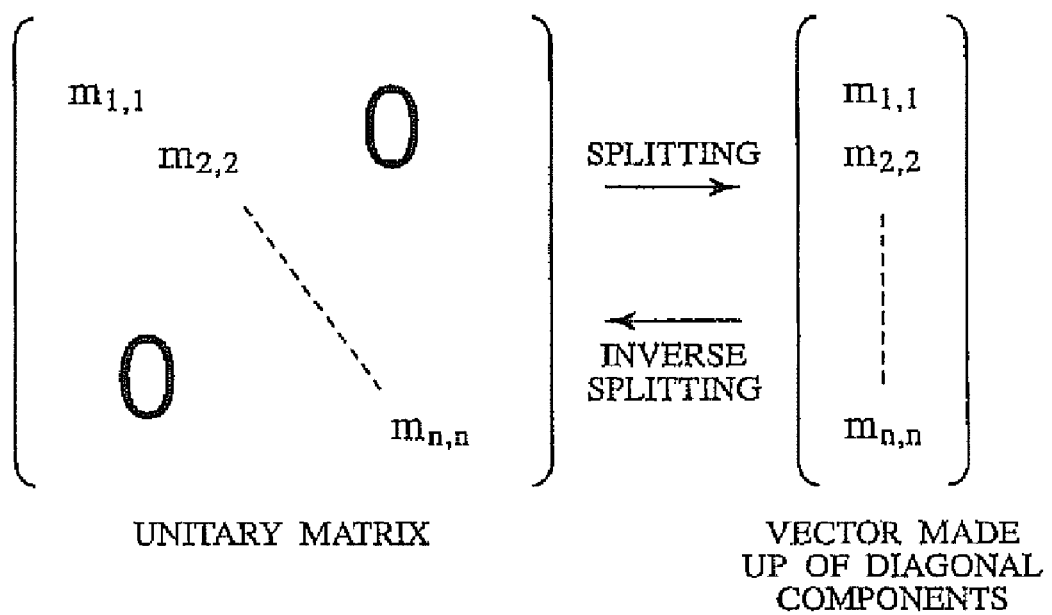
FIG. 3 is an explanatory diagram showing an explanation of a splitting process.

FIG. 3 explains the process of the splitter 111. As for an i-th signal, the splitter 111 outputs the value of the component on the i-th row and i-th column of the matrix. That is, in the above-described example, the splitter 111 outputs [Mathematical Expression 9].

$$\begin{pmatrix} i \\ i \end{pmatrix}$$ [Mathematical Expression 9]

Since all the components other than the component (diagonal component) on the i-th row and i-th column are 0, the information will not be lost even if such a process is performed. The splitter may interchange the outputs. When the splitting process is completed, the outputs are supplied to the inverse Fourier transform unit 112.

An embodiment in which the unitary matrix modulator 103 does not output a unitary matrix itself, but outputs the diagonal components of a unitary matrix may be employed. In this case, if the signal interchange by the splitter 111 is not performed, the splitter 111 becomes unnecessary and the outputs of the unitary matrix modulator 103 are directly supplied to the inverse Fourier transform unit 112. This means that in the present example, the vectors of the following [Mathematical Expression 10] to [Mathematical Expression 13] will be used instead of [Mathematical Expression 1] to [Mathematical Expression 4].

$$\begin{pmatrix} 1 \\ 1 \end{pmatrix}$$ [Mathematical Expression 10]

$$\begin{pmatrix} i \\ i \end{pmatrix}$$ [Mathematical Expression 11]

$$\begin{pmatrix} -1 \\ -1 \end{pmatrix}$$ [Mathematical Expression 12]

$$\begin{pmatrix} -i \\ -i \end{pmatrix}$$ [Mathematical Expression 13]

The inverse Fourier transform unit 112 performs inverse Fourier transform of the input signals in the same manner as in the ordinary OFDM communication. It is desired that the difference between the frequencies of the channels of inverse Fourier transform (the channels corresponding to sub-carriers of OFDM communication) performed by the inverse Fourier transform unit 112 be equal to or larger than a predetermined coherent bandwidth. A coherent bandwidth is a difference between the frequencies of channels through which a delayed wave will result in similar channel responses to each other. The longer the delay time of a delayed wave is, the narrower the coherent bandwidth of a channel is, whereas the shorter the delay time of a delayed wave is, the wider the coherent bandwidth of a channel is.

When considering an OFDM system for, for example, 128 sub-carriers in a bandwidth of 80 MHz, the bandwidth $\Delta f$ of a sub-carrier is $\Delta f=80$ MHz/128=625 kHz. Here, if it is assumed that RMS (Root Mead Squared) delay spread $\tau=714$ ns, the coherent bandwidth $B_c$ will be $B_c=1/(50\tau)=28$ kHz≈$0.048\Delta f$. The constant 50 in this equation is a calculation coefficient for the coherent bandwidth, and is a constant similar to a so-called safety coefficient.

Accordingly, in such a case, the difference between the frequencies of adjoining channels (sub-carriers) is sufficiently larger than the coherent bandwidth. Like this example, if the size of the RMS delay spread can be known from the condition of a propagation transmission path and the condition of the frequency band used, etc., the coherent bandwidth can be calculated from that size of the spread.

When the inverse Fourier transform is completed, the output signals are parallel-serial-converted by a parallel-serial converter 113 into a single signal, and a transmission unit 114 transmits the signal from one antenna 105. This stage is the same as the ordinary OFDM transmission.

Embodiment of Receiver Apparatus

Figure 4:
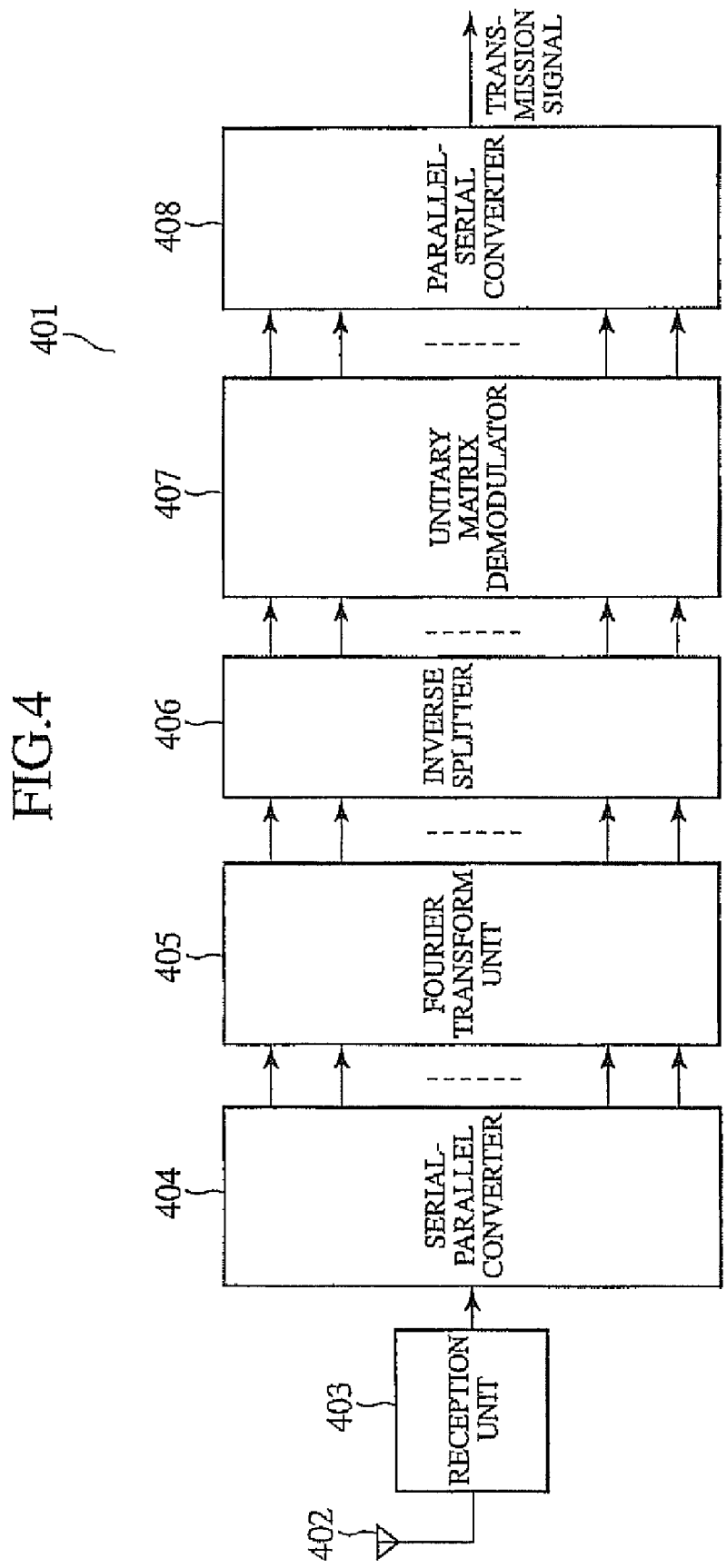
FIG. 4 is an exemplary diagram showing a rough structure of a receiver apparatus which is paired with the transmitter apparatus shown in FIG. 2.

FIG. 4 is an exemplary diagram showing a rough structure of a receiver apparatus, which will serve in pair with the transmitter apparatus 101 shown in FIG. 2. The following explanation will be given with reference to this drawing.

A reception unit 403 of the receiver apparatus 401 receives the signal transmitted from the transmitter apparatus 101 via an antenna 402. Next, a serial-parallel converter 404 serial-parallel-converts this received signal to output 2 intermediate signals. This value "2" is based on that the unitary matrix modulation used by the transmitter apparatus 101 uses a unitary matrix of 2 rows and 2 columns, hence m number of intermediate signals will be output in a case where a unitary matrix of m rows and m columns is used.

Then, a Fourier transform unit 405 performs Fourier transform of the intermediate signals likewise in the ordinary OFDM communication, to output 2 Fourier-transformed signals. The Fourier transform unit 405 is paired with the inverse Fourier transform unit 111 of the transmitter apparatus 101, and the difference between the frequencies of channels (sub-carriers) (the difference being the bandwidth of each channel (sub-carrier)) is equal to or larger than the coherent bandwidth, as described above.

Without various influences on the radio transmission path, the signals to be output here should be (proportional to) any of [Mathematical Expression 10] to [Mathematical Expression 13]. In reality, however, gaps from these signals are produced due to the influences on the radio transmission path.

Hence, an inverse splitter 406 determines to which of [Mathematical Expression 10] to [Mathematical Expression 13] the Fourier-transformed signals are the closest, to obtain a vector determined as the closest. The "closeness" is typically determined by the Euclidean distance between the vectors. However, various methods for calculating the "distance" may be employed, such as the total sum of the absolute values of the differences between the respective components of the vectors, etc.

Then, a unitary matrix is obtained, whose diagonal components are the components of the vector having been obtained through "inverse splitting", which is the inverse conversion of the splitting shown in FIG. 3.

A unitary matrix demodulator 407 outputs a vector ([Mathematical Expression 1] to [Mathematical Expression 4] in the above-described example) that is pre-associated with the unitary matrix output by the inverse splitter.

Further, a parallel-serial converter 408 parallel-serial-converts the vector output by the unitary matrix demodulator 407 and outputs it.

An existing electronic element circuit for fast Fourier transform can be used as the inverse Fourier transform unit 112 and the Fourier transform unit 405. However, in this case, the bandwidth of each channel (sub-carrier) is generally fixed. Hence, in a case where the bandwidth is narrower than the coherent bandwidth calculated in the above-described manner, it may be possible to broaden the difference between the frequencies of the frequency bands of the channels by using the channels by skipping some channels at predetermined intervals.

Other Embodiments

In the above-described embodiment, only one unitary matrix modulator and only one unitary matrix demodulator are employed to perform modulation and demodulation. According to the present embodiment, n number of unitary matrix modulators and unitary matrix demodulators respectively, each having m rows and m columns, are used, and m×n number of channels are used in OFDM. Typically, it is set that m=2, as is set so in the above-described embodiment.

Figure 5:
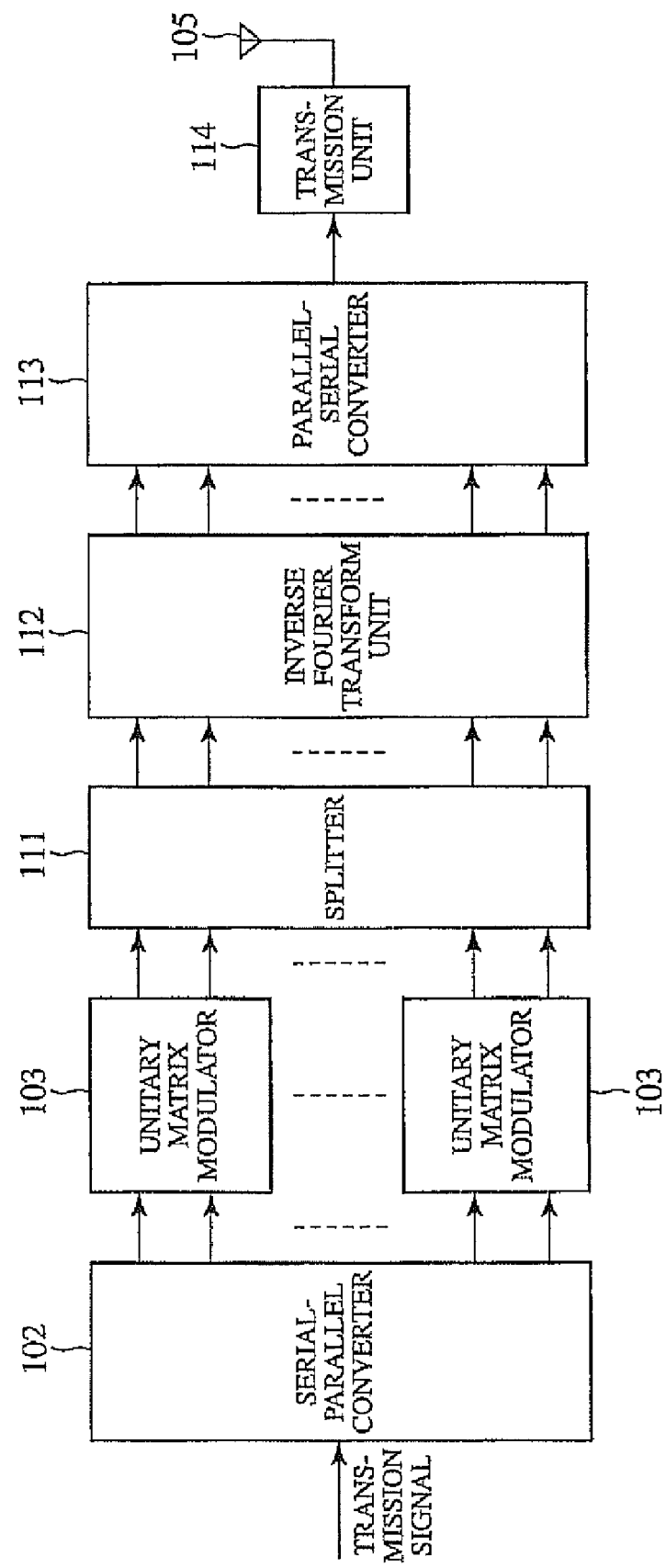
FIG. 5 is an exemplary diagram showing a rough structure of a transmitter apparatus according to another embodiment.
Figure 6:
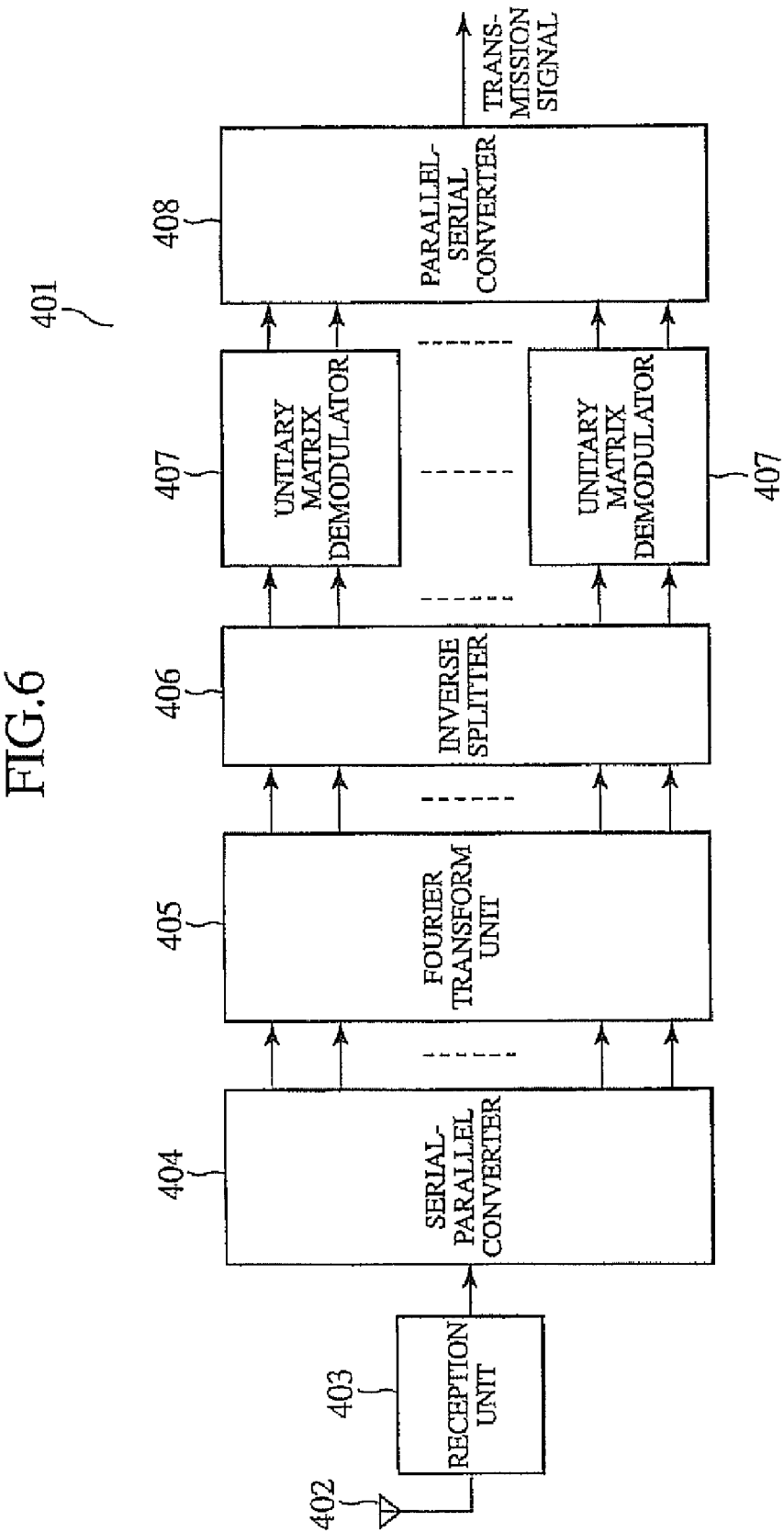
FIG. 6 is an exemplary diagram showing a rough structure of a receiver apparatus according to another embodiment.

FIG. 5 and FIG. 6 are explanatory diagrams showing a rough structure of a transmitter apparatus according to the present embodiment and a rough structure of a receiver apparatus according to the present embodiment, respectively. The components same as those in the above-described embodiment are given the same reference numerals.

In the transmitter apparatus 101, the serial-parallel converter 102 receives an input of a signal to be transmitted, and serial-parallel-converts the signal to output m×n (m≧2, n≧1) number of intermediate signals. These intermediate signals are denoted as $a_0, a_1, \ldots, a_{m \times n-1}$, sequentially.

The plurality of unitary matrix modulators 103 each modulate any m number of intermediate signals of the output m×n number of intermediate signals with no double-taking of the signals, into unitary matrices of m rows and m columns in which components other than the diagonal components are 0, and output the obtained matrices.

To assign numerals 0 to n−1 to the respective unitary matrix modulators 103, the i-th unitary matrix modulator 103 typically takes the intermediate signals $a_{i\times m}, a_{i\times m+1}, \ldots, a_{i\times m+m-1}$.

Hereinafter, to facilitate the understanding, the diagonal component on the j-th row and j-th column of the matrix output by the i-th unitary matrix modulator 103 is denoted as $r_{i,j}$.

Then, the splitter 104 supplies each of the diagonal components of the output matrices to the input channel of the inverse Fourier transform unit 105 as an input signal. At this time, it is desired that the diagonal components $r_{i,0}, r_{i,1}, \ldots, r_{i,m-1}, \ldots$, which are output from the same unitary matrix modulator 103 be supplied to the input channels having frequencies distanced from each other as much as possible. Further, at this time, the difference between the frequencies should be equal to or larger than the coherent bandwidth.

This condition is a more relaxed one than in the above-described embodiment. That is, according to the above-described embodiment, it is required that for all the combinations of input channels, the difference between their frequencies be equal to or larger than the coherent bandwidth. According to the present embodiment, it is sufficient if for the input channels to which diagonal components output from the same unitary matrix modulator 103 are to be supplied, the difference between their frequencies is equal to or larger than the coherent bandwidth.

The condition can be set so because signals (diagonal components) output from the same unitary matrix modulator 103 are similar in their channel response.

Needless to say, in the present embodiment as well, it is desirable as a cure for delayed waves that the difference between the frequencies is large for all the input channels. However, since being in the trade-off relation with the performance, these values may be adaptively set in accordance with the field of application.

Figure 7A:
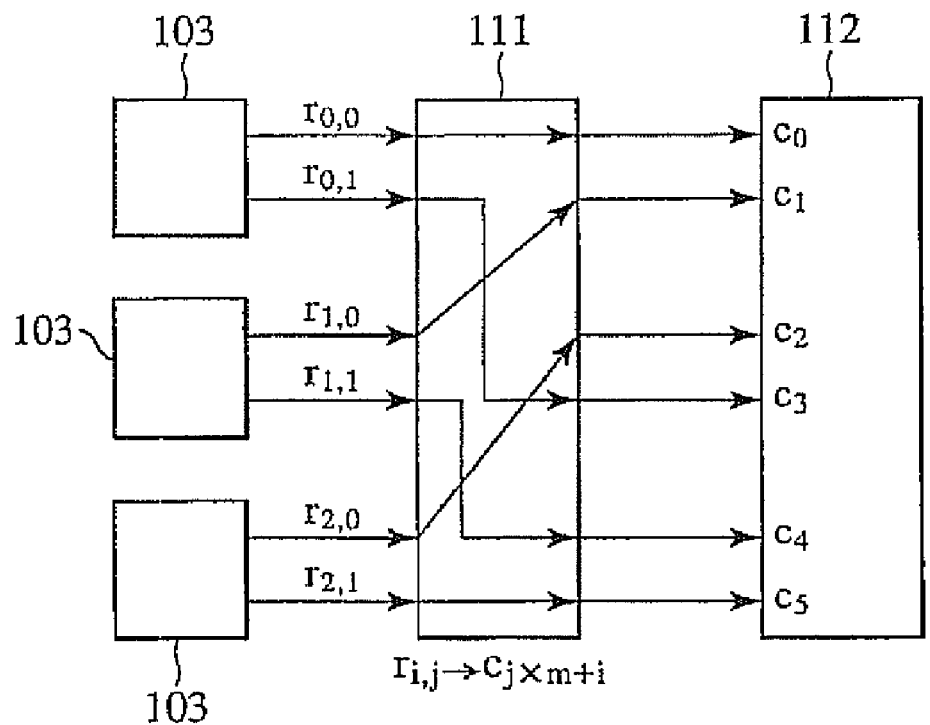
FIG. 7 are exemplary diagrams showing rough schemes of a splitting process according to another embodiment.

Here, assume that the input channels of the inverse Fourier transform unit 105 are named $c_0, c_1, \ldots, c_{m\times n-1}$ in the order of their frequencies. In order for the diagonal components $r_{i,0}, r_{i,1}, \ldots, r_{i,m-1}, \ldots$, output from the same unitary matrix modulator 103 to be supplied to the input channels having frequencies distanced as much as possible, the diagonal component $r_{i,j}$ should be supplied to the input channel $c_{j\times m+i}$. Such a method of supplying signals is shown in FIG. 7(a).

Figure 7B:
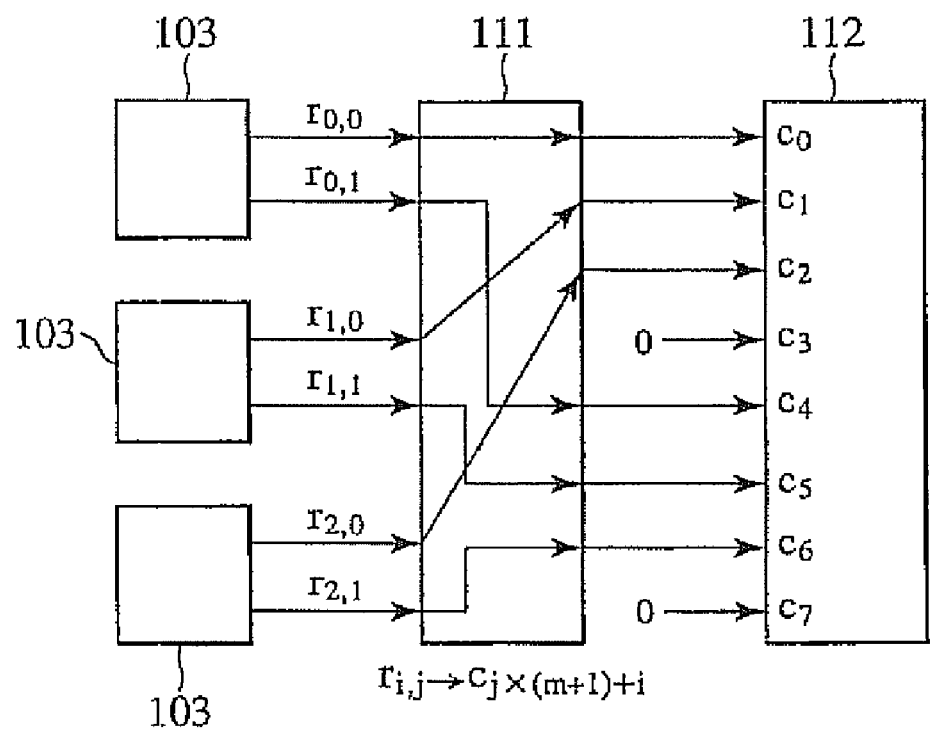

Other that this, a diagonal component $r_{i,j}$ may be supplied to $c_{j\times(m+k)+i}$, where k is a predetermined constant equal to or larger than 1. This is shown in FIG. 7(b). In this case, among the input channels of the inverse Fourier transform unit 105, some of them (channels corresponding to $c_{j\times(m+k)+i+1}$ to $c_{j\times(m+k)+i+k-1}$) are not supplied with the outputs from the unitary matrix modulators 105. Thus, typically, the value 0 will be supplied thereto. However, these input channels may be supplied with known signals, so that these channels may be used for transmitting pilot signals. In this case, the receiver apparatus 401 can have additional processes such as signal compensation of various kinds, by synchronizing with the pilot signals.

Then, the inverse Fourier transform unit 105 outputs a plurality of inverse-Fourier-transformed signals obtained by performing inverse Fourier transform of the input signals supplied to the input channels thereof.

The parallel-serial converter 106 parallel-serial-converts the output plurality of inverse-Fourier-transformed signals to output one transmission signal.

The transmission unit 107 transmits the output transmission signal.

On the other hand, the receiver apparatus 401 counter to the transmitter apparatus 101 comprises a reception unit 403, a serial-parallel converter 404, a Fourier transform unit 405, an inverse splitter 406, a plurality of unitary matrix demodulators 407, and a parallel-serial converter 408, and is structured as follows.

The reception unit 403 receives the transmission signal as transmitted, via the antenna 402, and outputs it as a reception signal.

The serial-parallel converter 404 serial-parallel converts the output reception signal to output m×n (m≧2, n≧1) number of intermediate signals.

Further, the Fourier transform unit 405 outputs m×n number of Fourier-transformed signals obtained by performing Fourier transform of the output m×n number of intermediate signals.

Then, the inverse splitter 406 supplies the output m×n number of Fourier-transformed signals to the unitary matrix demodulators 407, with n number of signals supplied to each, with no doubles. The correspondence here is reverse to that in the transmitter apparatus 101. To describe it with reference to the examples shown in FIG. 7, the inverse splitting process is obtained by reversing the arrows indicating the directions in which the signals are supplied.

Each of the plurality of unitary matrix demodulators 407 demodulates a unitary matrix of m rows and m columns whose components other than the diagonal components are 0, from a matrix of m rows and m columns in which each of the supplied m number of Fourier-transformed signals is its diagonal component and the components other than the diagonal components are 0. That is, likewise in the above-described embodiment, the unitary matrix demodulator 407 selects one of "predetermined unitary matrices" that has the smallest Euclidean distance from "the matrix of m rows and m columns in which each of the Fourier-transformed signals is its diagonal component and the components other than the diagonal components are 0", i.e., one of "vectors each made up of the diagonal components of any of the predetermined unitary matrices" that has the smallest Euclidean distance from "the vector whose components are the respective Fourier-transformed signals", and outputs the signal which is associated with the selected vector as the demodulated signal.

For example, in a case where [Mathematical Expression 14] shown below is "the matrix of m rows and m columns in which each of the Fourier-transformed signals is its diagonal component and the components other than the diagonal components are 0", the one among [Mathematical Expression 1] to [Mathematical Expression 4] that is the closest to this matrix in terms of the Euclidean distance is the unitary matrix represented by [Mathematical Expression 1]. Thus, the demodulated signal is [Mathematical Expression 5].

$$\begin{pmatrix} 0.8 & 0 \\ 0 & 0.9 \end{pmatrix} \qquad \text{[Mathematical Expression 14]}$$

Before the Euclidean distance is calculated, "the matrix of m rows and m columns in which each of the Fourier-transformed signals is its diagonal component and the components other than the diagonal components are 0" may be appropriately normalized. For example, a conceivable method is to divide each diagonal component by "the root mean of the diagonal components". In this case, to calculate the normalized matrix corresponding to [Mathematical Expression 14],

[Mathematical Expression 15] is obtained, since the root mean of the diagonal components is 0.85147.

$$\begin{pmatrix} 0.93955 & 0 \\ 0 & 1.05700 \end{pmatrix}$$ [Mathematical Expression 15]

Then, the parallel-serial converter 407 parallel-serial-converts the plurality of demodulated signals as demodulated, and outputs them as the signals having been transmitted.

As regards the selection of a unitary matrix whose components other than the diagonal components are 0, and the association between a signal and a unitary matrix in the transmitter apparatus 101 and receiver apparatus 401, a selection and association that are common among the respective "pairs of unitary matrix modulators 103 and their corresponding unitary matrix demodulators 407" may be employed for each pair, or selections and associations varied among the pairs may be employed. Particularly, for adjoining "unitary matrix modulators 103 and their corresponding unitary matrix demodulators 407", varied selections and associations of the unitary matrix may be employed.

The performance of the communication by these transmitter apparatus and receiver apparatus under the environment of the Doppler frequency of 10 Hz was calculated by computer simulation. In case of employing splitting of 98 samples, the BER (Bit Error Rate) was improved by as much as $10^{-2}$ at Eb/No of 5 db as compared with earlier OFDM communications, proving the effectiveness of the present technique.

With the techniques of software radio, etc., these transmitter apparatus and receiver apparatus can be realized by providing software to various kinds of computers, FPGA (Field Programmable Gate Array), and DSP (Digital Signal Processor).

INDUSTRIAL APPLICABILITY

According to the present invention, it is possible to provide a transmitter apparatus, a receiver apparatus, a transmitting method, and a receiving method for performing efficient communication by using modulation/demodulation by a unitary matrix in which components other than the diagonal components are 0, and a program for realizing these on a computer.

What is claimed is:

1. A transmitter apparatus, comprising a serial-parallel converter, a unitary matrix modulator, a splitter, an inverse Fourier transform unit, a parallel-serial converter, and a transmission unit, wherein:

said serial-parallel converter receives an input of a signal to be transmitted, and serial-parallel-converts the signal to output m (m≧2) number of intermediate signals;

said unitary matrix modulator modulates the output m number of intermediate signals into a unitary matrix having m rows and m columns whose components other than whose diagonal components are 0, and outputs the obtained matrix;

said splitter supplies the respective diagonal components of the output matrix to input channels of said inverse Fourier transform unit as input signals;

said inverse Fourier transform unit outputs m number of inverse-Fourier-transformed signals obtained by performing inverse Fourier transform of the input signals supplied to the input channels;

said parallel-serial converter parallel-serial-converts the output m number of inverse-Fourier-transformed signals to output one transmission signal; and said transmission unit transmits the output transmission signal.

2. A receiver apparatus, comprising a reception unit, a serial-parallel converter, a Fourier transform unit, an inverse splitter, a unitary matrix demodulator, and a parallel-serial converter, wherein:

said reception unit receives a transmission signal having been transmitted, and outputs this as a reception signal;

said serial-parallel converter serial-parallel-converts the output reception signal to output m (m≧2) number of intermediate signals;

said Fourier transform unit outputs m number of Fourier-transformed signals obtained by performing Fourier transform of the output m number of intermediate signals;

said inverse splitter supplies the output m number of Fourier-transformed signals to said unitary matrix demodulator;

said unitary matrix demodulator demodulates a signal associated with a unitary matrix having m rows and m columns whose components other than whose diagonal components are 0, from a matrix having m rows and m columns in which each of the supplied m number of Fourier-transformed signals are its diagonal component and components other than the diagonal components are 0, and outputs the signal as a demodulated signal; and said parallel-serial converter parallel-serial-converts the demodulated plurality of demodulated signals, and outputs them as a signal having been transmitted.

3. A transmitting method, comprising a serial-parallel converting step, a unitary matrix modulating step, a splitting step, an inverse Fourier transforming step, a parallel-serial converting step, and a transmitting step, wherein:

at said serial-parallel converting step, an input of a signal to be transmitted is received and the signal is serial-parallel-converted to output m (m≧2) number of intermediate signals;

at said unitary matrix modulating step, the output m number of intermediate signals are modulated into a unitary matrix having m rows and m columns whose components other than whose diagonal components are 0, and the obtained matrix is output;

at said splitting step, the respective diagonal components of the output matrix are supplied to input channels of inverse Fourier transform as input signals;

at said inverse Fourier transforming step, m number of inverse-Fourier-transformed signals are output, which are obtained by performing inverse Fourier transform of the input signals supplied to the input channels of inverse Fourier transform;

at said parallel-serial converting step, the output m number of inverse-Fourier-transformed signals are parallel-serial-converted to output one transmission signal; and at said transmitting step, the output transmission signal is transmitted.

4. A receiving method, comprising a receiving step, a serial-parallel converting step, a Fourier transforming step, an inverse splitting step, a unitary matrix demodulating step, and a parallel-serial converting step, wherein:

at said receiving step, a transmission signal having been transmitted is received and output as a reception signal;

at said serial-parallel converting step, the output reception signal is serial-parallel converted to output m (m≧2) number of intermediate signals;

at said Fourier transforming step, m number of Fourier-transformed signals are output, which are obtained by performing Fourier transform of the output m number of intermediate signals;

at said inverse splitting step, the output m number of Fourier-transformed signals are supplied to said unitary matrix demodulating step;

at said unitary matrix demodulating step, a signal associated with a unitary matrix having m rows and m columns whose components other than whose diagonal components are 0 is demodulated from a matrix having m rows and m columns in which each of the supplied m number of Fourier-transformed signals is its diagonal component and components other than the diagonal components are 0, and this signal is output as a demodulated signal; and at said parallel-serial converting step, the demodulated plurality of demodulated signals are parallel-serial-converted, to output them as a signal having been transmitted.

5. A non-transitory information recording medium storing a program for controlling a computer to function as a serial-parallel converter, a unitary matrix modulator, a splitter, an inverse Fourier transform unit, a parallel-serial converter, and a transmission unit, wherein in said computer, said program controls:

said serial-parallel converter to receive an input of a signal to be transmitted and serial-parallel-convert the signal to output m ($m \geq 2$) number of intermediate signals;

said unitary matrix modulator to modulate the output m number of intermediate signals into a unitary matrix having m rows and m columns whose components other than whose diagonal components are 0 and output the obtained matrix;

said splitter to supply the respective diagonal components of the output matrix to input channels of said inverse Fourier transform unit as input signals;

said inverse Fourier transform unit to output m number of inverse-Fourier-transformed signals obtained by performing inverse Fourier transform of the input signals supplied to the input channels thereof;

said parallel-serial converter to parallel-serial-convert the output m number of inverse-Fourier-transformed signals to output one transmission signal; and said transmission unit to transmit the output transmission signal.

6. A non-transitory information recording medium storing a program for controlling a computer to function as a reception unit, a serial-parallel converter, a Fourier transform unit, an inverse splitter, a unitary matrix demodulator, and a parallel-serial converter, wherein in said computer, said program controls:

said reception unit to receive a transmission signal having been transmitted and output this as a reception signal;

said serial-parallel converter to serial-parallel-convert the output reception signal to output m ($m \geq 2$) number of intermediate signals;

said Fourier transform unit to output m number of Fourier-transformed signals obtained by performing Fourier transform of the output m number of intermediate signals;

said inverse splitter to supply the output m number of Fourier-transformed signals to said unitary matrix demodulator;

said unitary matrix demodulator to demodulate a signal associated with a unitary matrix having m rows and m columns whose components other than whose diagonal components are 0, from a matrix having m rows and m columns in which each of the supplied m number of Fourier-transformed signals is its diagonal component and components other than the diagonal components are 0, and output the signal as a demodulated signal; and said parallel-serial converter to parallel-serial-convert the demodulated plurality of demodulated signals to output them as a signal having been transmitted.

7. A transmitter apparatus, comprising a serial-parallel converter, a plurality of unitary matrix modulators, a splitter, an inverse Fourier transform unit, a parallel-serial converter, and a transmission unit, wherein:

said serial-parallel converter receives an input of a signal to be transmitted, and serial-parallel-converts the signal to output m×n ($m \geq 2$, $n \geq 1$) number of intermediate signals;

said plurality of unitary matrix modulators each modulate any m number of signals of the output m×n number of intermediate signals, with no doubles, into a unitary matrix having m rows and m columns whose components other than whose diagonal components are 0, and output the obtained matrix;

said splitter supplies the respective diagonal components of the output matrix to input channels of said inverse Fourier transform unit as input channels;

said inverse Fourier transform unit outputs m number of inverse-Fourier-transformed signals obtained by performing inverse Fourier transform of the input signals supplied to the input channels thereof;

said parallel-serial converter parallel-serial-converts the output m number of inverse-Fourier-transformed signals to output one transmission signal; and said transmission unit transmits the output transmission signal.

8. The transmitter apparatus according to claim 7, wherein a diagonal component on a j-th row and a j-th column of a matrix output from an i-th one of the plurality of unitary matrix modulators (where $0 \leq i < n$, $0 \leq j < m$) is supplied to a j×m+i-th input channel of said inverse Fourier transform unit.

9. A receiver apparatus, comprising a reception unit, a serial-parallel converter, a Fourier transform unit, an inverse splitter, a plurality of unitary matrix demodulators, and a parallel-serial converter, wherein:

said reception unit receives a transmission signal having been transmitted, and outputs this as a reception signal;

said serial-parallel converter serial-parallel-converts the output reception signal to output m×n ($m \geq 2$, $n \geq 1$) number of intermediate signals;

said Fourier transform unit outputs m×n number of Fourier-transformed signals obtained by performing Fourier-transform of the output m×n number of intermediate signals;

said inverse splitter supplies n number of signals of the output m×n number of Fourier-transformed signals to each of said unitary matrix demodulators with no doubles;

each of said plurality of unitary matrix demodulators demodulates a signal associated with a unitary matrix having m rows and m columns whose components other than whose diagonal components are 0, from a matrix having m rows and m columns in which each of the supplied m number of Fourier-transformed signals is its diagonal component and components other than the diagonal components are 0, and outputs this as a demodulated signal; and said parallel-serial converter parallel-serial-converts the plurality of demodulated signals having been demodulated, and outputs them as signals having been transmitted.

10. The receiver apparatus according to claim 9, wherein each of said plurality of unitary matrix demodulators compares each of a plurality of predetermined unitary matrices which each have m rows and m columns and whose components other than whose diagonal components are 0, with a matrix having m rows and m columns in which each of the supplied m number of Fourier-transformed signals is its diagonal component and components other than the diagonal components are 0, selects one of the plurality of predetermined unitary matrices that has a smallest Euclidean distance, and obtains the selected one as a demodulation result.

11. The receiver apparatus according to claim 10, wherein a diagonal component on a j-th row and a j-th column of the matrix compared by an i-th one of said plurality of unitary matrix demodulators (where $0 \leq i < n$, $0 \leq j < m$) is one that has been output from a j×m+i-th output channel of said inverse Fourier transform unit.

12. A non-transitory information recording medium storing a program for controlling a computer to function as a serial-parallel converter, a plurality of unitary matrix modulators, a splitter, an inverse Fourier transform unit, a parallel-serial converter, and a transmission unit, wherein in said computer, said program controls:
    said serial-parallel converter to receive an input of a signal to be transmitted and serial-parallel-convert the signal to output m×n ($m \geq 2$, $n \geq 1$) number of intermediate signals;
    said plurality of unitary matrix modulators to each modulate any m number of signals of the output m×n number of intermediate signals, with no doubles, into a unitary matrix having m rows and m columns whose component other than whose diagonal components are 0, and output the obtained matrix;
    said splitter to supply the respective diagonal components of the output matrix to input channels of said inverse Fourier transform unit as input channels;
    said inverse Fourier transform unit to output m number of inverse-Fourier-transformed signals obtained by performing inverse Fourier transform of the input signals supplied to the input channels thereof;
    said parallel-serial converter to parallel-serial-convert the output m number of inverse-Fourier-transformed signals to output one transmission signal; and
    said transmission unit to transmit the output transmission signal.

13. The non-transitory information recording medium storing the program according to claim 12, which controls said computer to function in a manner that a diagonal component on a j-th row and a j-th column of a matrix output from an i-th one of the plurality of unitary matrix modulators (where $0 \leq i < n$, $0 \leq j < m$) is supplied to a j×m+i-th input channel of said inverse Fourier transform unit.

14. A non-transitory information recording medium storing a program for controlling a computer to function as a reception unit, a serial-parallel converter, a Fourier transform unit, an inverse splitter, a plurality of unitary matrix demodulators, and a parallel-serial converter, wherein in said computer, said program controls:
    said reception unit to receive a transmission signal having been transmitted, and output this as a reception signal;
    said serial-parallel converter to serial-parallel-convert the output reception signal to output m×n ($m \geq 2$, $n \geq 1$) number of intermediate signals;
    said Fourier transform unit to output m×n number of Fourier-transformed signals obtained by performing Fourier-transform of the output m×n number of intermediate signals;
    said inverse splitter to supply n number of signals of the output m×n number of Fourier-transformed signals to each of said unitary matrix demodulators with no doubles;
    each of said plurality of unitary matrix demodulators to demodulate a signal associated with a unitary matrix having m rows and m columns whose components other than whose diagonal components are 0, from a matrix having m rows and m columns in which each of the supplied m number of Fourier-transformed signals is its diagonal component and components other than the diagonal components are 0, and output this as a demodulated signal; and
    said parallel-serial converter to parallel-serial-convert the plurality of demodulated signals having been demodulated, and outputs them as signals having been transmitted.

15. The non-transitory information recording medium storing the program according to claim 14, which controls said computer in a manner that each of said plurality of unitary matrix demodulators compares each of a plurality of predetermined unitary matrices which each have m rows and m columns and whose components other than whose diagonal components are 0, with a matrix having m rows and m columns in which each of the supplied m number of Fourier-transformed signals is its diagonal component and components other than the diagonal components are 0, selects one of the plurality of predetermined unitary matrices that has a smallest Euclidean distance, and obtains the selected one as a demodulation result.

16. A non-transitory information recording medium storing the program according to claim 15, which controls said computer to function in a manner that a diagonal component on a j-th row and a j-th column of the matrix compared by an i-th one of said plurality of unitary matrix demodulators (where $0 \leq i < n$, $0 \leq j < m$) is one that has been output from a j×m+i-th output channel of said inverse Fourier transform unit.

\* \* \* \* \*